(12) United States Patent
Sato

(10) Patent No.: US 6,550,131 B1
(45) Date of Patent: Apr. 22, 2003

(54) METHOD FOR MAKING A THIN-FILM MAGNETIC HEAD

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 174 days.

(21) Appl. No.: 09/591,255

(22) Filed: Jun. 9, 2000

Related U.S. Application Data

(62) Division of application No. 09/207,244, filed on Dec. 8, 1998.

(30) Foreign Application Priority Data

Dec. 9, 1997 (JP) .............................................. 9-339139

(51) Int. Cl.$^7$ .......................... G11B 5/127; H04R 31/00
(52) U.S. Cl. ................................. 29/603.14; 29/603.15; 29/603.16; 29/603.18; 216/22; 216/39; 216/40; 216/51; 360/119; 360/121; 360/122; 360/125; 360/126; 360/320
(58) Field of Search ......................... 29/603.14, 603.15, 29/603.16, 603.18; 360/119, 121, 122, 125, 126, 320; 216/22, 39, 40, 51

(56) References Cited

U.S. PATENT DOCUMENTS

| | | | |
|---|---|---|---|
| 3,908,194 A | 9/1975 | Romankiw | 360/113 |
| 3,975,772 A | 8/1976 | Lin | 360/113 |
| 4,127,884 A | 11/1978 | Nouchi et al. | 360/119 |
| 4,489,357 A | 12/1984 | Van Ooijen et al. | 360/113 |
| 4,663,685 A | 5/1987 | Tsang | 360/113 |
| 4,734,644 A | 3/1988 | Imakoshi et al. | 324/252 |
| 4,891,725 A | 1/1990 | Mowry | 360/113 |
| 5,225,951 A | 7/1993 | Kira et al. | 360/113 |
| 5,264,981 A * | 11/1993 | Campbell et al. | 360/126 |
| 5,458,908 A * | 10/1995 | Krounbi et al. | 427/123 |
| 5,568,335 A | 10/1996 | Fontana et al. | 360/113 |
| 5,617,277 A | 4/1997 | Chen et al. | 360/113 |
| 5,634,260 A * | 6/1997 | Nix et al. | 29/603.14 |
| 5,675,459 A | 10/1997 | Sato et al. | 360/113 |
| 5,695,657 A * | 12/1997 | Shibata et al. | 216/22 |
| 5,737,155 A * | 4/1998 | George et al. | 360/113 |
| 5,894,388 A * | 4/1999 | Sato et al. | 360/126 |
| 5,967,889 A * | 10/1999 | Tikhonov | 29/603.13 |
| 5,978,184 A | 11/1999 | Terunuma | 360/113 |
| 5,992,004 A * | 11/1999 | Sato et al. | 29/603.14 |
| 5,999,379 A | 12/1999 | Hsiao et al. | 360/113 |
| 6,033,580 A * | 3/2000 | Shouji et al. | 216/22 |
| 6,038,106 A * | 3/2000 | Aboaf et al. | 360/113 |
| 6,067,703 A * | 5/2000 | Takahashi et al. | 29/603.13 |
| 6,172,858 B1 * | 1/2001 | Yoda et al. | 360/313 |
| 6,210,543 B1 * | 4/2001 | Kobayashi | 204/192.2 |
| 6,239,955 B1 * | 5/2001 | Dovek et al. | 360/321 |

FOREIGN PATENT DOCUMENTS

JP      09-016922      1/1997

\* cited by examiner

Primary Examiner—Peter Vo
Assistant Examiner—Paul Kim
(74) Attorney, Agent, or Firm—Brinks Hofer Gilson & Lione

(57) ABSTRACT

A method for making a thin-film magnetic head with a magnetoresistive layer having a desired shaped to facilitate narrowing of the track width, wherein the surface, in the depth direction, is not curved, and wherein the shape and magnetic anisotropy of each sublayer of the magnetoresistive layer is stabilized to ensure improved reading characteristics.

6 Claims, 9 Drawing Sheets

US 6,550,131 B1

METHOD FOR MAKING A THIN-FILM MAGNETIC HEAD

This is a divisional application of U.S. Ser. No. 09/207,244, filed Dec. 8, 1998, now pending.

BACKGROUND OF THE INVENTION

1. Field of the Invention

The present invention relates to thin-film magnetic heads mounted in, for example, hard disk drives. Specifically, the present invention relates to a thin-film magnetic head and to a method that is capable of production of the thin-film magnetic head having a highly precise planar shape.

2. Description of the Related Art

FIG. 5 is an enlarged cross-sectional view away from a recording medium of a conventional thin-film magnetic head. This thin-film magnetic head is a reading head using magnetoresistive effects, and is provided at the side face, lying at the trailing edge, of a slider of a floating head. An inductive magnetic head for writing may also be disposed on the reading head.

A lower shielding layer 1 is formed of an alloy, e.g. sendust or permalloy (a Ni—Fe alloy). A lower gap layer 2 composed of a nonmagnetic material, e.g. alumina ($Al_2O_3$), is formed on the lower shielding layer 1, and a magnetoresistive layer 15 is deposited thereon. The magnetoresistive layer 15 comprises a giant magnetoresistive (GMR) element, such as an anisotropic magnetoresistive (AMR) element or a spin-valve film. The magnetoresistive layer 15 senses leakage magnetic fluxes from a recording medium as a change in resistance and outputs them as a change in voltage. The magnetoresistive layer 15 has a width T4 in the direction of the track width (the transverse direction in the drawing), and the width T4 is slightly larger than the track width Tw.

Hard magnetic bias layers 4 are formed as a longitudinal bias layer at both sides of the magnetoresistive layer 15, and electrode layers 5 that are composed of an electrically conductive nonmagnetic material, such as chromium or tantalum are formed on the hard magnetic bias layers 4. An upper gap layer 7 composed of a nonmagnetic material such as alumina is formed on the electrode layers 5, and an upper shielding layer 8 composed of, for example, permalloy is formed on the upper gap layer 7.

A method for making the magnetoresistive layer 15 shown in FIG. 5 will now be described with reference to FIGS. 6A to 6C and 7A to 7B. The drawings at the left sides and the right sides of FIG. 6A to 6C and FIGS. 7A to 7B are cross-sectional views and plan views, respectively, of the thin-film magnetic head in each production step. The cross-sectional view shown in FIG. 6A is taken from a transverse line at the central region of the magnetoresistive layer 15 in the width T6 in the plan view. The same relationship holds for the other drawings.

The lower gap layer 2 is deposited on the lower shielding layer 1, and then a magnetoresistive layer 15' is deposited on the entire lower gap layer 2. As shown FIG. 6A, a resist layer 20 is formed on the magnetoresistive layer 15'. Since the resist layer 20 is of a lift-off type, indentations 20a are formed at both bottom sides of the resist layer 20. As shown in the plan view of FIG. 6A, the resist layer 20 is formed on the entire magnetoresistive layer 15' other than at two windows 20b. Thus, the magnetoresistive layer 15' is exposed at the windows 20b.

The width of the resist layer 20 between the windows 20b is set to T5. The resist layer 20 is provided to determine the width of the magnetoresistive layer 15' in the track width direction, hence the width of the resist layer 20 is made substantially equal to the width T4 of the completed magnetoresistive layer 15 (refer to FIG. 5).

The regions of the magnetoresistive layer 15' exposed from the resist layer 20 are removed by etching to expose the lower gap layer 2, as shown in FIG. 6B. The hard magnetic bias layers 4 and the electrode layers 5 are then formed on the exposed regions of the lower gap layer 2, as shown in FIG. 6C. A stripping solution is penetrated into the interface of the resist layer 20 and the magnetoresistive layer 15' though the indentations 20a, and then the resist layer 20 is removed.

As shown in FIG. 7A, a resist layer 21 is formed on the magnetoresistive layer 15" and the electrode layers 5. Since the resist layer 21 is not of a lift-off type, it has no indentations at the bottom sides. The resist layer 21 has a length L3 in the depth direction in order to define the length of the magnetoresistive layer 15" in the depth direction. Thus, the length L3 of the resist layer 21 is substantially equal to the length (not shown in the drawing) of the completed magnetoresistive layer 15 shown in FIG. 5.

The exposed region of the magnetoresistive layer 15" which is not covered with the resist layer 21 is removed by etching. The magnetoresistive layer 15 is thereby formed on the lower gap layer 2, and the hard magnetic bias layers 4 and the electrode layers 5 are formed on both sides of the magnetoresistive layer 15.

As described above, in the formation of the magnetoresistive layer 15, the width T4 of the magnetoresistive layer 15 in the track width is first determined by the lift-off-type resist layer 20, the hard magnetic bias layers 4 and the electrode layers 5 are formed, and then the length of the magnetoresistive layer 15 in the depth direction is determined by the resist layer 21.

The method for making the magnetoresistive layer 15, however, has the following disadvantages. In FIG. 6C, the total thickness of the hard magnetic bias layer 4 and the electrode layer 5 is larger than the thickness of the magnetoresistive layer 15". Thus, as shown in FIG. 7A, the thickness h1 of the resist layer 21 on the magnetoresistive layer 15" is larger than the thickness h2 on the electrode layers 5. Such a difference in the thickness causes random scattering in the exposure step due to improper focusing. As a result, the planar shape of the resist layer 21 in the transverse direction of the drawing or the track width direction is not linear as shown in the plan view of FIG. 7A, but is instead curved in the air bearing surface (ABS) direction and the depth direction, which is the reverse direction of the ABS direction.

Thus, the planar shape of the magnetoresistive layer 15 completed by etching the exposed region is also curved in the ABS face direction and the depth direction, by following the shape of the resist layer 21, as shown in FIG. 8A. Since the side in the ABS direction is polished in a subsequent step to planarize it as shown in FIG. 8B, the curvature is not substantially disadvantageous. The face in the depth direction is, however, not subjected to any treatment in the subsequent steps; hence the curved face of the magnetoresistive layer 15 in the depth direction remains.

In the step shown in FIG. 7A, the resist layer 21 is post-baked to enhance etching resistance of the resist layer 21 prior to the etching of the exposed region. The resist layer 21 is deformed by post-baking from the rectangular shape as shown in FIG. 7A to a rounded shape. A modified layer 21' is formed on the resist layer 21 due to the effects of argon during ion-milling etching, as shown in FIG. 9 (a longitudinal cross-sectional view of the thin-film magnetic head having the resist layer 21). Since the modified layer 21' is not removed by the resist stripping solution, it must be removed by an oxygen-plasma dry etching process.

The oxygen-plasma dry etching process, however, also etches the surfaces of the magnetoresistive layer 15 in the depth direction and the ABS direction that adjacent to the modified layer 21'. Thus, an indented section is formed on these surfaces. Since the surface in the depth direction is not subjected to any treatment in the subsequent steps as described above, the indented section of the magnetoresistive layer 15 in the depth direction remains, although the indented section in the ABS section is polished (see FIG. 8B).

With a narrowing trend of the track width for achieving high-density recording, the width T4 of the magnetoresistive layer 15 in the track width direction and the length in the depth direction are further decreased. Thus, the relatively large curvature and/or indentation on the surface of the magnetoresistive layer 15 in the depth direction adversely affects characteristics of the resulting thin-film magnetic head. That is, the magnetoresistive layer 15 has a multilayered structure, hence the shape and magnetic anisotropy of each sublayer of the magnetoresistive layer 15 is not stabilized, and its direct current resistance (DCR) varies at different places. These disadvantages inhibit stable reading characteristics.

SUMMARY OF THE INVENTION

Accordingly, it is an object of the present invention to provide a thin-film magnetic head having stable reading characteristics.

It is another object of the present invention to provide a method for making a thin-film magnetic head having a desired magnetoresistive layer.

A thin-film magnetic head in accordance with the present invention comprises: a nonmagnetic lower gap layer;

a nonmagnetic upper gap layer; a magnetoresistive layer; an electrode layer; and an intermediate gap layer conducting a sensing current to the magnetoresistive layer; the magnetoresistive layer and the electrode layer being formed between the lower gap layer and the upper gap layer, the intermediate gap layer being disposed between the lower gap layer and the upper gap layer; wherein the intermediate gap layer is formed in the region at both sides of the magnetoresistive layer in the track width direction and/or in the region behind the magnetoresistive layer in the depth direction.

Preferably, the thickness of the intermediate gap layer is substantially equal to the thickness of the magnetoresistive layer.

A method for making a thin-film magnetic head in accordance with the present invention comprises: a step for forming a nonmagnetic lower gap layer on a lower shielding layer; a step for forming a magnetoresistive layer on the entire surface of the lower gap layer; a step for forming a first lift-off-type resist layer on the magnetoresistive layer, and removing by etching the exposed region of the magnetoresistive layer not covered with the first lift-off-type resist layer; a step for forming an intermediate gap layer on the region, exposed by the etching step for the lower gap layer; a step for forming a second lift-off-type resist layer on the magnetoresistive layer and the intermediate layer, and removing by etching both ends of the magnetoresistive layer and the exposed region the intermediate gap layer not covered with the second lift-off-type resist layer; and a step for forming an electrode layer on the region, exposed by the etching step for the lower gap layer, and removing the second lift-off-type resist layer.

Preferably, the length of the magnetoresistive layer in the depth direction is determined by the first lift-off-type resist layer, and then the width of the magnetoresistive layer in the track width direction is determined by the second lift-off-type resist layer.

Preferably, the thickness of the intermediate gap layer is made substantially equal to the thickness of the magnetoresistive layer.

In accordance with the method of the present invention, a miniaturized magnetoresistive layer having a desired shape can be formed, hence each sublayer of the magnetoresistive layer has stabilized formal magnetic anisotropy that ensures improved reading characteristics.

According to the method of the present invention, the surface, in the depth direction, of magnetoresistive layer of the present invention is not curved.

Since the method in accordance with the present invention does not require an oxygen plasma dry etching process, the magnetoresistive layer can be produced without damage.

DESCRIPTION OF THE PREFERRED EMBODIMENTS

Figure 1:
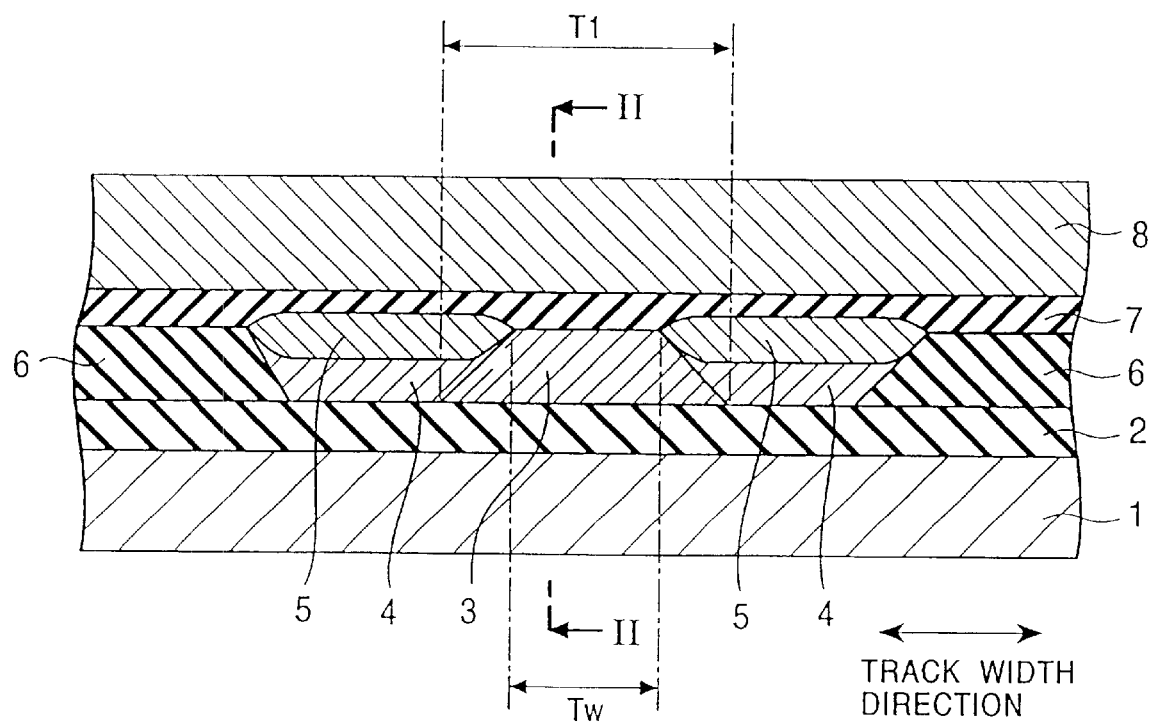
FIG. 1 is an enlarged cross-sectional view of a thin-film magnetic head in accordance with the present invention.
Figure 2:
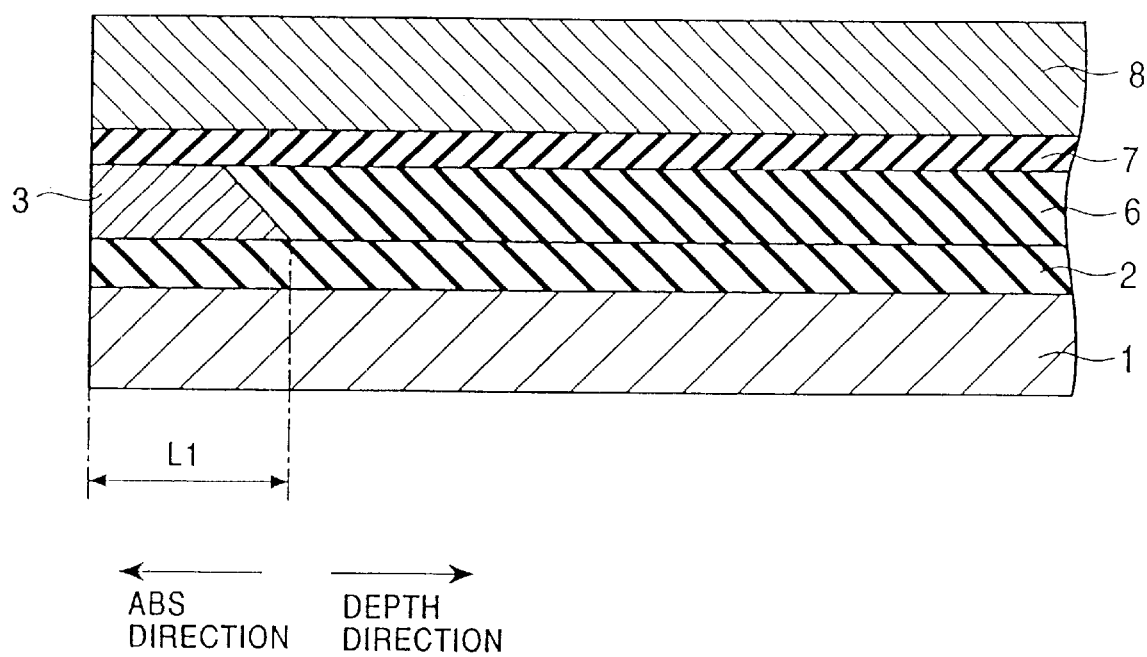
FIG. 2 is a cross-sectional view taken from line II—II of FIG. 1.

FIG. 1 is an enlarged cross-sectional view of a thin-film magnetic head in accordance with the present invention from the side away from a recording medium, and FIG. 2 is a cross-sectional view taken from line II—II of FIG. 1. The thin-film magnetic head shown in FIG. 1 is formed on the end face at the trailing side of a slider of a floating-type head and functions as a reading head. The thin-film magnetic head may be a MR/inductive-type composite thin-film magnetic head including a reading head and a writing inductive head comprising a core and a coil and provided on the reading head. The reading head detects leakage magnetic fluxes from recording signals on a recording medium such as a hard disk by magnetoresistive effects.

The bottom layer in FIGS. 1 and 2 is a lower shielding layer 1 that is composed of a Ni—Fe alloy or permalloy. A lower gap layer 2 composed of alumina ($Al_2O_3$) is formed on the lower shielding layer 1. A magnetoresistive layer 3 is formed on the lower gap layer 2. The magnetoresistive layer 3 is an anisotropic magnetoresistive (AMR) element including three sublayers, that is, a soft adjacent layer (SAL) composed of a soft magnetic material such as a Co—Zr—Mo alloy or a Ni—Fe—Nb alloy; a shunt layer composed of a nonmagnetic material such as tantalum; and a magnetoresistive (MR) layer having magnetoresistive effects; or a spin-valve type thin-film element (a type of giant magnetoresistive (GMR) element) including four sublayers, that is, an antiferromagnetic layer composed of, for example, a Pt—Mn alloy; a fixed magnetic layer composed of, for example, a Ni—Fe alloy; a nonmagnetic conductive layer composed of copper; and a free magnetic layer composed of, for example a Ni—Fe alloy. The magnetoresistive layer 3 has a width T1 in the track width direction which is substantially equal to the track width Tw, as shown in FIG. 1, and a length L1 in the depth direction, as shown in FIG. 2.

Hard magnetic bias layers 4 and electrode layers 5 are formed on both sides of the magnetoresistive layer 3, as shown in FIG. 1. When the magnetoresistive layer 3 is composed of a spin-valve-type thin-film element, a biasing magnetic field from the hard magnetic bias layers 4 is conducted to the free magnetic layer, whereas the sensing current from the electrode layers 5 is conducted to the fixed magnetic layer, the nonmagnetic conductive layer, and the free magnetic layer. The hard magnetic bias layers 4 are formed of, for example, a Co—Pt alloy or a Co—Cr—Pt alloy. The electrode layers 5 are formed of chromium or tantalum.

In the present invention intermediate gap layers 6 are formed between the lower gap layer 2 and the upper gap layer 7. The intermediate gap layers 6 are formed over the side regions next to the hard magnetic bias layers 4 and the electrode layers 5 provided at both sides of the magnetoresistive layer 3 in the track width direction, as shown in FIG. 1, and over the rear region behind the magnetoresistive layer 3 in the depth direction, as shown in FIG. 2. It is preferable in the present invention that the thickness of the intermediate gap layers 6 be the same as the thickness of the magnetoresistive layer 3. The intermediate gap layers 6 are formed of an insulating material such as $Al_2O_3$ as in the lower and upper gap layers 2 and 7. The upper gap layer 7 is formed over the magnetoresistive layer 3, the electrode layers 5, and the intermediate gap layers 6, and an upper shielding layer 8 composed of a nonmagnetic material such as permalloy is formed on the upper gap layer 7.

The intermediate gap layers 6 formed between the upper and lower gap layers 2 and 7 are essential for the production of the magnetoresistive layer 3, as will be described below.

FIGS. 3A to 3D and 4A to 4D are cross-sectional views away from the recording medium (the left side) and plan views (the right side) of production steps of the magnetoresistive layer 3 in accordance with the present invention. Each cross-sectional view corresponds to the central section of its plan view.

Figure 3A:
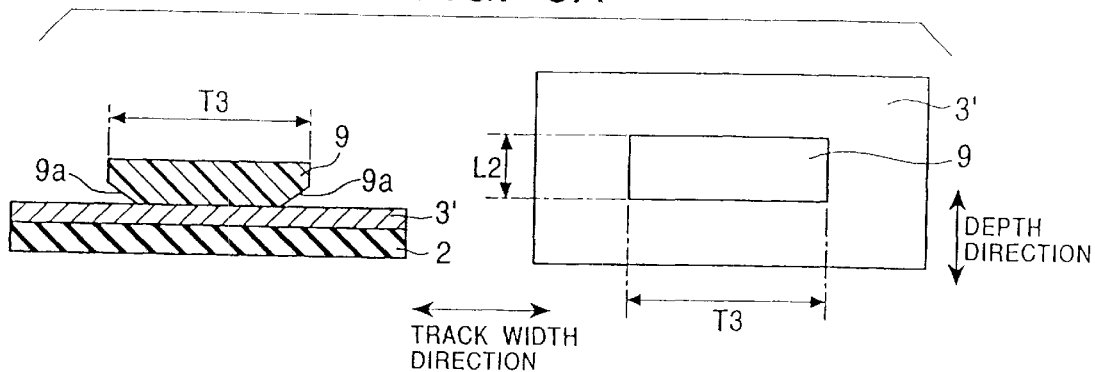
FIGS. 3A to 3D and 4A to 4D are cross-sectional views and plan views of production steps of a thin-film magnetic head in accordance with the present invention.

A lower gap layer 2 is formed on a lower shielding layer 1 (refer to FIGS. 1 and 2), and a magnetoresistive layer 3' is formed on the entire surface of the lower gap layer 2. As shown in FIG. 3A, a first lift-off-type resist layer 9 (hereinafter referred to as "first resist layer 9") is formed on the magnetoresistive layer 3'. As shown in the plan view of FIG. 3A, the first resist layer 9 has a length L2 in the depth direction that is substantially the same as the length L1 of the magnetoresistive layer 3 shown in FIG. 2 in the depth direction. Accordingly, the first resist layer 9 determines the length L1 of the magnetoresistive layer 3 in the depth direction. The width T3 of the first resist layer 9 in the track width must be larger than the width T1 of the magnetoresistive layer 3 in the track width.

Figure 3B:
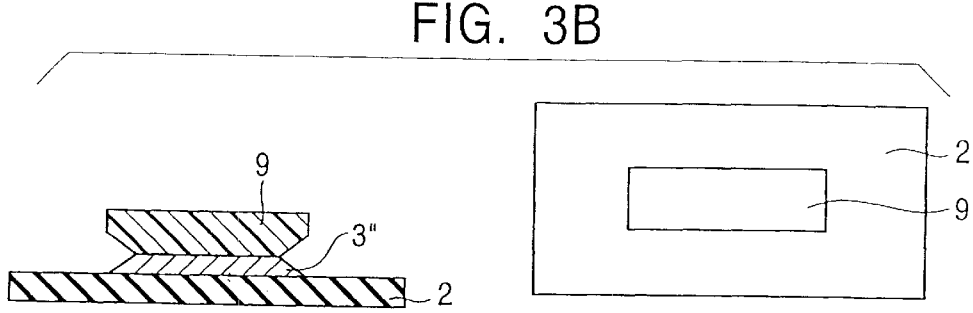

The first resist layer 9 has indentations 9a at the bottom sections for lifting off. The exposed region of the magnetoresistive layer 3' not covered with the first resist layer 9 is removed by etching, as shown in FIG. 3B, so that the magnetoresistive layer 3" has a length L1 in the depth direction.

Figure 3C:
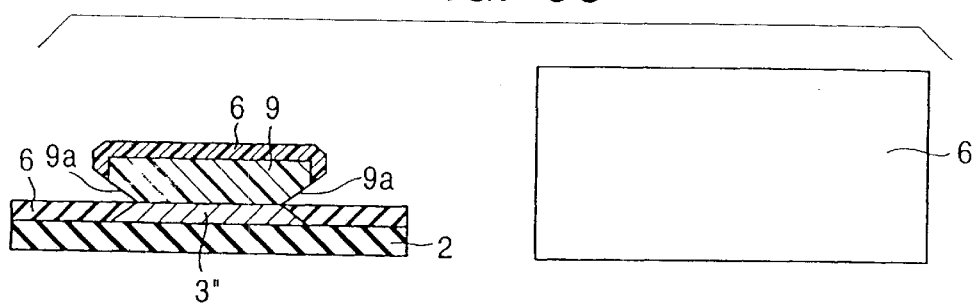
Figure 3D:
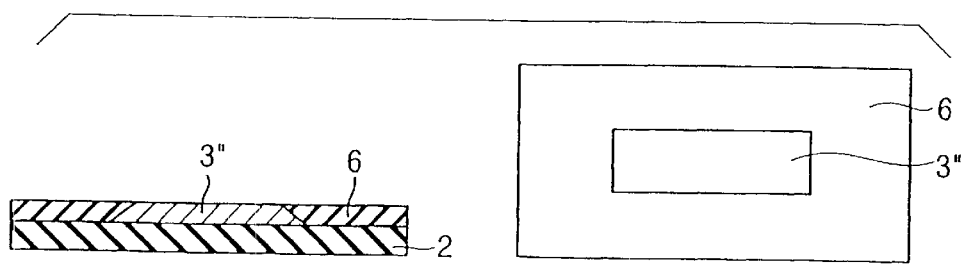

As shown in FIG. 3C, intermediate gap layers 6 composed of an insulating material are formed on the lower gap layer 2 exposed in the former step, so that the thickness of the intermediate gap layers 6 is substantially the same as the thickness of the magnetoresistive layer 3". The intermediate gap layer 6 is spontaneously formed on the first resist layer 9 other than on the indentations 9a in this step. A resist stripping solution is penetrated from the indentations 9a of the first resist layer 9 and the first resist layer 9 is removed. A planarized surface composed of the magnetoresistive layer 3" and the intermediate gap layers 6 is thereby formed on the lower gap layer 2, because the magnetoresistive layer 3" and the intermediate gap layers 6 have substantially the same thickness.

Figure 4A:
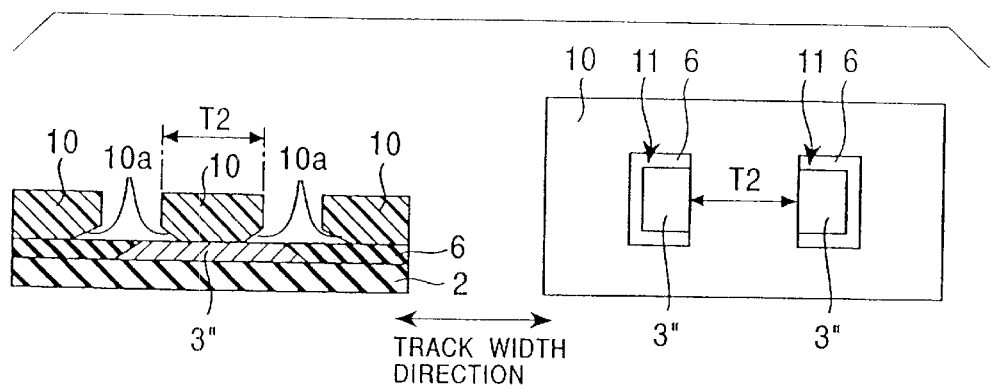

As shown in the plan view of FIG. 4A, a second lift-off resist layer 10 (hereinafter referred to as "second resist layer 10") is formed over the magnetoresistive layer 3" and the intermediate gap layer 6, except for two window sections 11 that are arranged at an interval T2 in the track width direction. Since the second resist layer 10 is formed on the planarized surface, it has a uniform thickness. As shown in the plan view of FIG. 4A, the second resist layer 10 has a width T2 between the window sections 11. The width T2 is substantially the same as the width T1 of the magnetoresistive layer 3 shown in FIG. 1 in the track width direction. Thus, the second resist layer 10 determines the width of the magnetoresistive layer 3 and the position of hard magnetic bias layers 4 and electrode layers 5 which will be formed later. The second resist layer 10 has indentations 10a at the bottom for lifting-off.

Figure 4B:
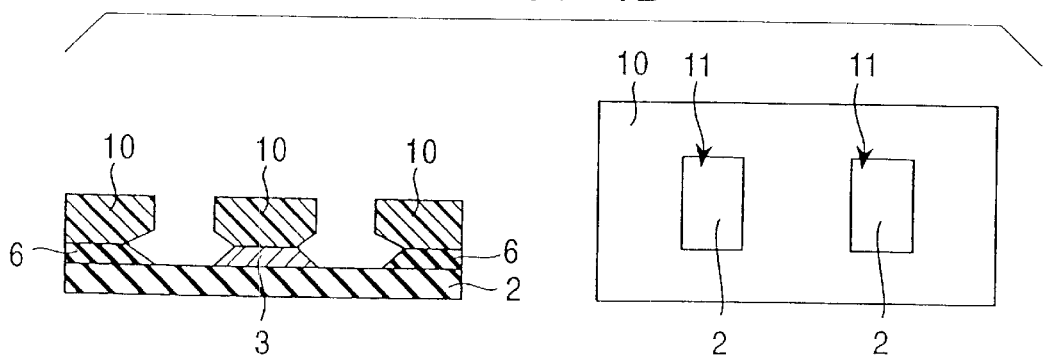

The exposed regions of the magnetoresistive layer 3" and the intermediate gap layers 6 at the widow sections that are not covered with the second resist layer 10 are removed by etching, as shown in FIG. 4B. Thus, a magnetoresistive layer 3 having a length L1 in the track width direction and the intermediate gap layers 6 are formed on the lower gap layer 2 except for on the window sections 11.

Figure 4C:
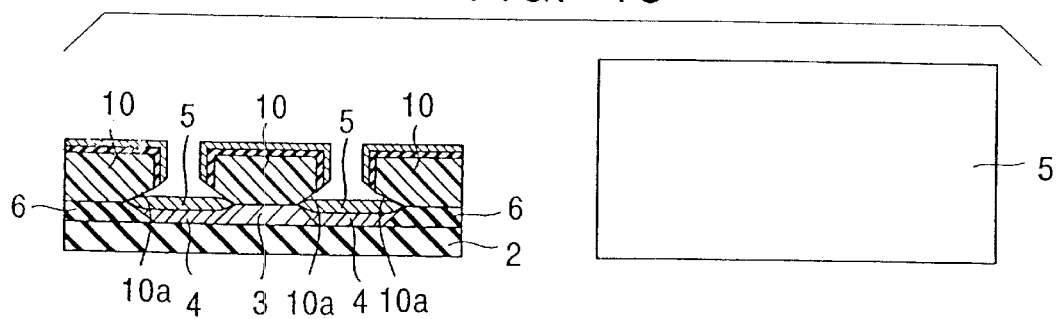
Figure 4D:
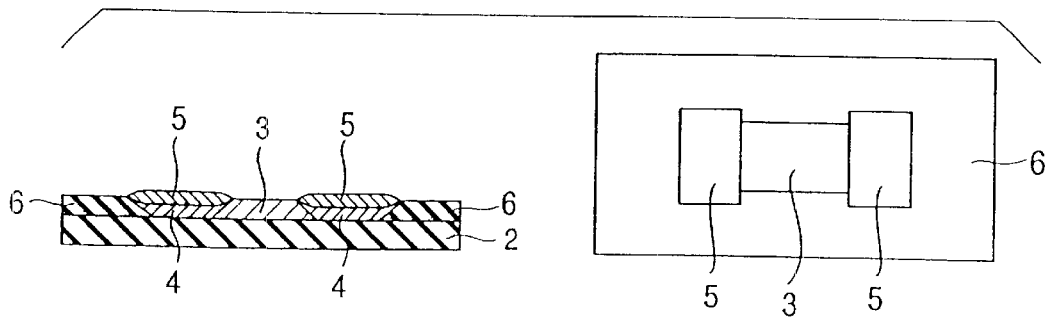
Figure 5:
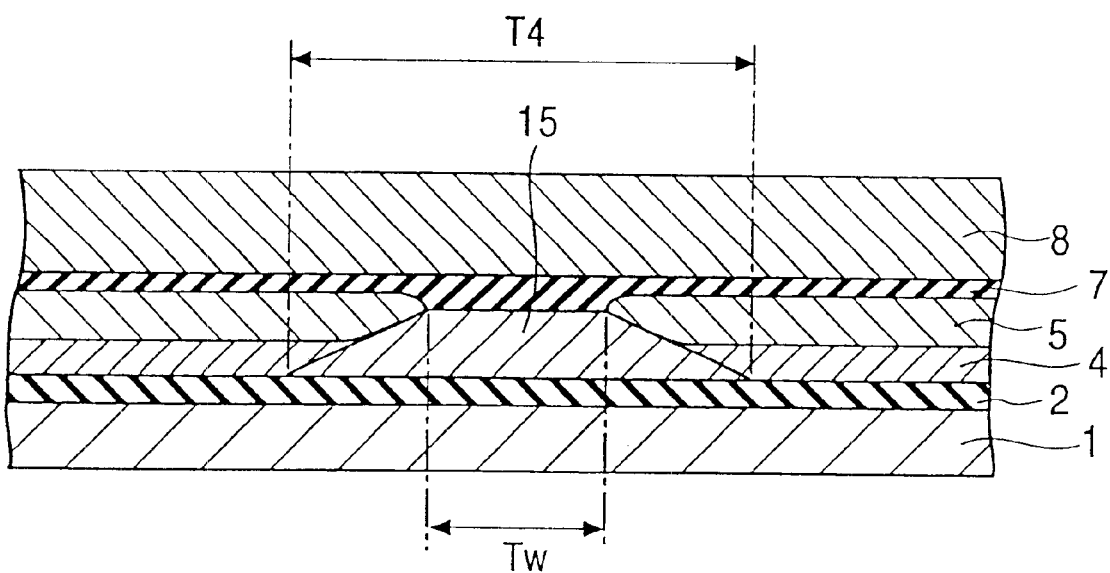
FIG. 5 is an enlarged cross-sectional view of a conventional thin-film magnetic head.

As shown in FIG. 4C, hard magnetic bias layers 4 and then electrode layers 5 are formed on both sides of the magnetoresistive layer 3. The hard magnetic bias layers 4 and the electrode layers 5 are spontaneously formed on the second resist layer 10 other than the indentations 10a. A resist stripping solution is penetrated from the indentations 10a and the second resist layer 10 is removed as shown in FIG. 4D. The upper gap layer 7 and the upper shielding layer 8 shown in FIGS. 1 and 2 are formed over the magnetoresistive layer 3, the electrode layers 5, and the intermediate gap layers 6 shown in FIG. 4D, and then the ABS (the front surface) of the resulting product is polished until the magnetoresistive layer 3 is exposed.

Figure 6A:
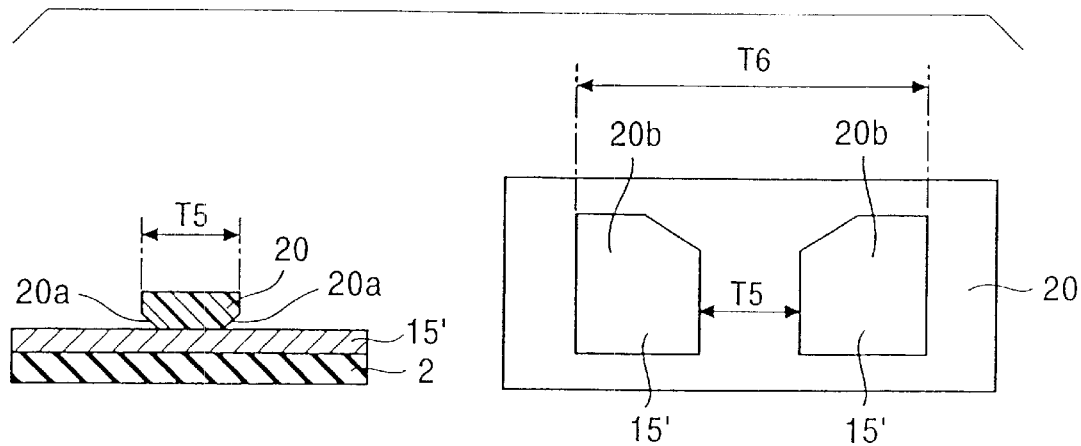
FIGS. 6A to 6C and 7A to 7B are cross-sectional views and plan views of production steps of a conventional thin-film magnetic head.
Figure 6B:
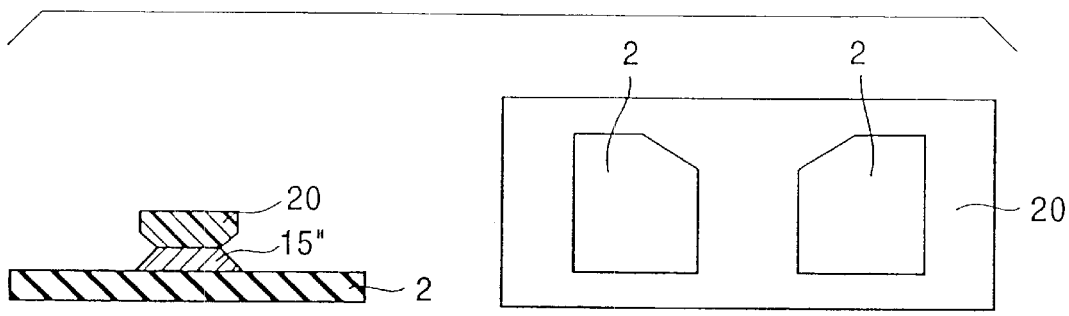
Figure 6C:
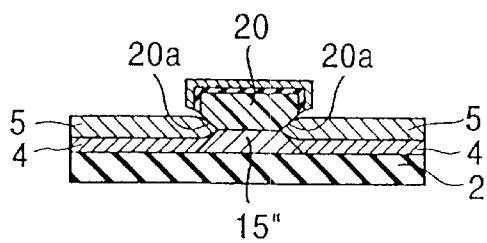
Figure 7A:
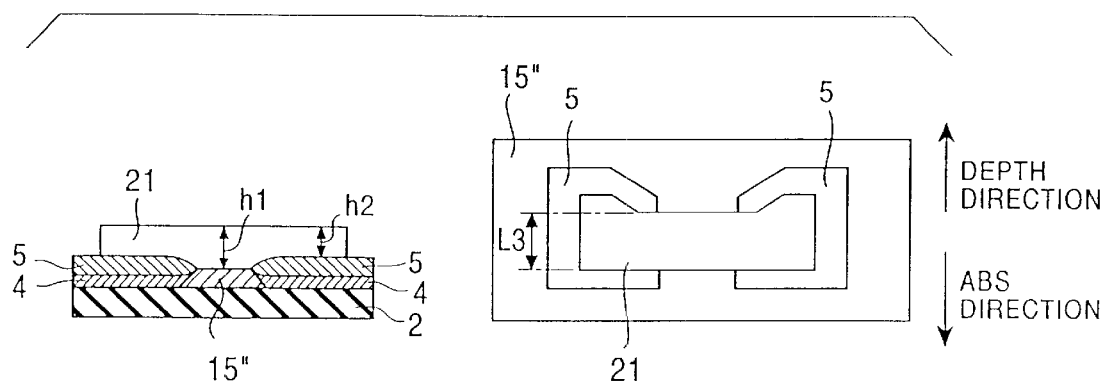
Figure 7B:
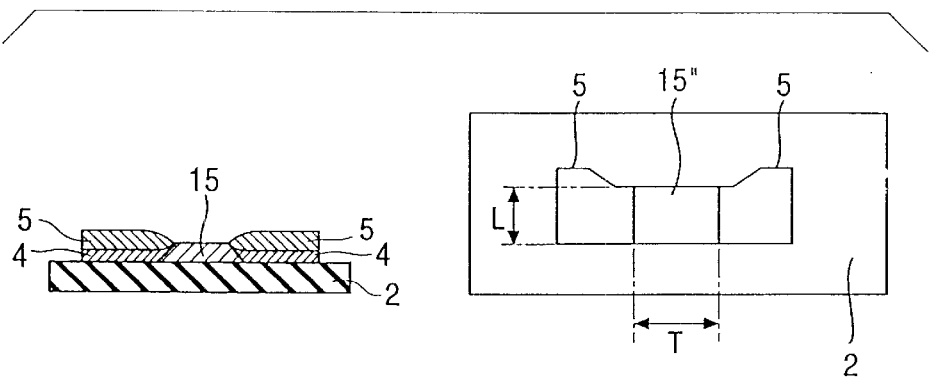
Figure 8A:
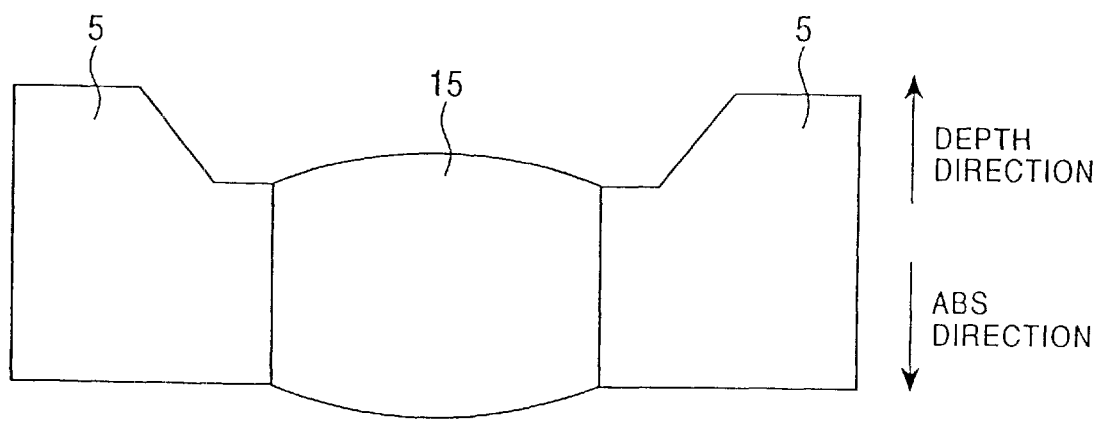
FIG. 8A is a plan view showing the shape of the magnetoresistive layer formed by the production steps showed in FIGS. 6A to 7B.
Figure 8B:
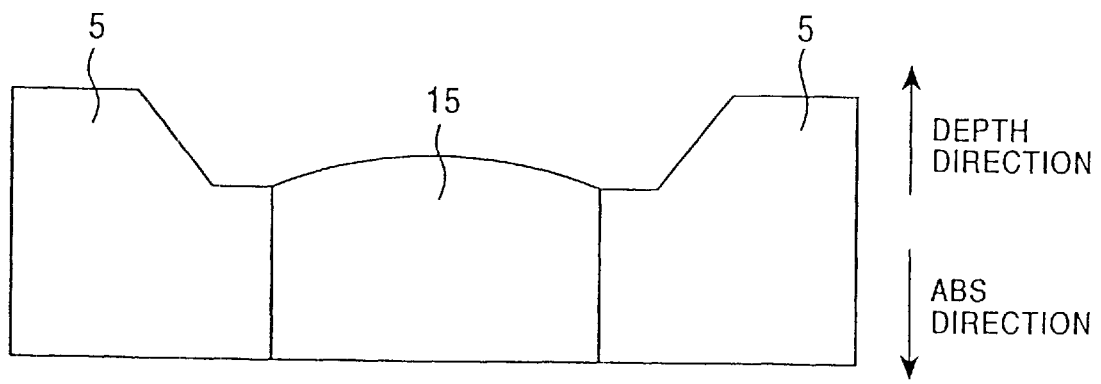
FIG. 8B is a plan view showing the shape after planarization of the ABS of the magnetoresistive layer shown in FIG. 8A.
Figure 9:
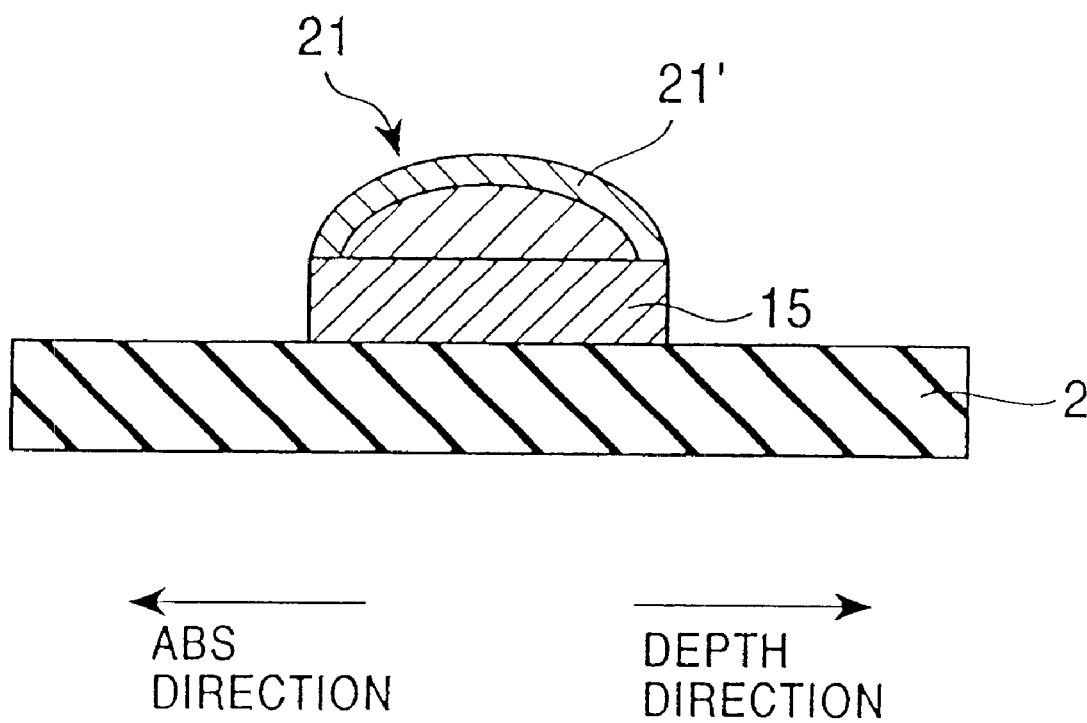
FIG. 9 is a longitudinal cross-sectional view of a thin-film magnetic head having a resist layer in a conventional production step.

In a conventional process, the width of the magnetoresistive layer in the track width direction is first determined, hard magnetic bias layers and electrode layers are formed, and then the length of the magnetoresistive layer in the depth direction is determined. In contrast, in the present invention as described above, the length L1 of the magnetoresistive layer 3 in the depth direction is first determined, the width T1 of the magnetoresistive layer 3 in the track width direction is determined, and then the hard magnetic bias layers 4 and the electrode layers 5 are formed. If the width T1 is first determined as in the conventional process, it is impossible to form the hard magnetic bias layers 4 and the electrode layers 5 using the same resist layer 10 in this process. Thus, a complicated process or a conventional process as shown in FIGS. 6 and 7 must be employed. Accordingly, it is essential to determine first the length L1 of the magnetoresistive layer 3 in the depth direction in the method in accordance with the present invention.

Since the hard magnetic bias layers 4 and the electrode layers 5 are formed after the formation of the magnetoresistive layer 3 in the present invention, the method of the present invention does not include a step for simultaneously forming a resist layer over the magnetoresistive layer 3 and the electrode layers 5, which is necessary in the conventional process. Accordingly, this method does not result in curving of the surface at the height side of the magnetoresistive layer 3 due to a difference in the thickness of the resist layer.

The magnetoresistive layer can be formed using the lift-off resist layers 9 and 10 that are removable by a resist stripping solution, and thus, the method of the present invention requires no dry etching process by oxygen plasma. Thus, the magnetoresistive layer can be formed without damage.

After the length L1 of the magnetoresistive layer 3 in the depth direction is determined, the intermediate gap layers 6 having substantially the same thickness as that of the intermediate gap layer 6 are formed around the magnetoresistive layer 3 in the present invention. Thus, the second resist layer 10 can be uniformly formed on the planarized surface (see FIG. 4A). If the intermediate gap layers 6 are not formed, the thickness of the second resist layer 10 differs between a position on the magnetoresistive layer 3 and a position on the lower gap layer 2. Thus, random reflection will occur during exposure of the second resist layer 10, and it is very likely that the end of the second resist layer 10 in the track width direction will curve. Accordingly, the end of the magnetoresistive layer 3 in the track width direction is also curved by following the shape of the second resist layer 10. Thus, the magnetoresistive layer 3 does not have a desired shape. If the intermediate gap layer 6 is not formed, the exposed section of the lower gap layer 2 not covered with the resist layer 10 is undesirably etched.

In accordance with the method of the present invention, a miniaturized magnetoresistive layer 3 having a desired shape can be formed so that it can meet the demand for narrowing the track width. As a result, each sublayer of the magnetoresistive layer 3 has a stabilized magnetic anisotropic shape that ensures improved reading characteristics.

What is claimed is:

1. A method for making a thin-film magnetic head comprising:

forming a nonmagnetic lower gap layer on a lower shielding layer;

forming a magnetoresistive layer on the entire surface of said lower gap layer;

forming a first lift-off-type resist layer on a portion of said magnetoresistance layer, thereby resulting in first exposed regions of said magnetoresistance layer not covered with the first lift-off-type resist layer;

removing by etching the first exposed regions of said magnetoresistive layer not covered with the first lift-off-type resist layer, thereby resulting in second exposed regions comprising portions of the lower gap layer not covered by the magnetoresistive layer;

forming an intermediate gap layer on said second exposed regions;

removing the first lift-off type resist layer;

forming a second lift-off-type resist layer on the magnetoresistive layer and both ends of the intermediate gap layer, thereby resulting in third exposed regions comprising portions of the magnetoresistive layer or the intermediate gap layer not covered with the second lift-off-type resist layer, wherein a length of said magnetoresistive layer in a depth direction is determined by said first lift-off-type resist layer, and a width of said magnetoresistive layer in track width direction is determined by said second lift-off-type resist layer;

removing by etching said third exposed regions not covered with the second lift-off-type resist layer, thereby resulting in fourth exposed regions comprising portions of the lower gap layer;

forming an electrode layer on said fourth exposed regions; and removing the second lift-off-type resist layer.

2. The method for making a thin-film magnetic head according to claim 3, wherein a thickness of said intermediate gap layer is made substantially equal to a thickness of said magnetoresistive layer.

3. The method for making a thin-film magnetic head according to claim 1, wherein a thickness of said intermediate gap layer is substantially equal to a thickness of said magnetoresistive layer.

4. The method for making a thin-film magnetic head according to claim 1, wherein a bias layer and an electrode layer are disposed on the fourth exposed region.

5. A method for making a thin-film magnetic head comprising:

forming a nonmagnetic lower gap layer on a lower shielding layer;

forming a magnetoresistive layer on the entire surface of said lower gap layer;

forming a first lift-off-type resist layer on a portion of said magnetoresistance layer, thereby resulting in first exposed regions of said magnetoresistance layer not covered with the first lift-off-type resist layer;

removing by etching the first exposed regions of said magnetoresistive layer not covered with the first lift-off-type resist layer, thereby resulting in second exposed regions comprising portions of the lower gap layer not covered by the magnetoresistive layer;

forming an intermediate gap layer on said second exposed regions;

removing the first lift-off type resist layer;

forming a second lift-off-type resist layer on the magnetoresistive layer and both ends of the intermediate gap layer, thereby resulting in third exposed regions comprising portions of the magnetoresistive layer or the intermediate gap layer not covered with the second lift-off-type resist layer, wherein a length of said magnetoresistive layer in a depth direction is determined by said first lift-off-type resist layer, and a width of said magnetoresistive layer in track width direction is determined by said second lift-off-type resist layer, wherein a thickness of said intermediate gap layer is substantially equal to a thickness of said magnetoresistive layer;

removing by etching said third exposed regions not covered with the second lift-off-type resist layer, thereby resulting in fourth exposed regions comprising portions of the lower gap layer;

forming an electrode layer on said fourth exposed regions; and removing the second lift-off-type resist layer.

6. The method for making a thin-film magnetic head according to claim 5, wherein a bias layer and an electrode layer are disposed on the fourth exposed region.

* * * * *